(12) United States Patent
Cossairt et al.

(10) Patent No.: US 11,400,371 B2
(45) Date of Patent: Aug. 2, 2022

(54) INTERACTIVE VIDEO GAME SYSTEM

(71) Applicant: Universal City Studios LLC, Universal City, CA (US)

(72) Inventors: Travis Jon Cossairt, Celebration, FL (US); Wei Cheng Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 32 days.

(21) Appl. No.: 16/877,321

(22) Filed: May 18, 2020

(65) Prior Publication Data

US 2020/0276501 A1 Sep. 3, 2020

Related U.S. Application Data

(63) Continuation of application No. 15/833,839, filed on Dec. 6, 2017, now Pat. No. 10,653,957.

(51) Int. Cl.
*G06F 3/01* (2006.01)
*A63F 9/24* (2006.01)
(Continued)

(52) U.S. Cl.
CPC ............ *A63F 13/52* (2014.09); *A63F 13/213* (2014.09); *A63F 13/25* (2014.09); *A63F 13/335* (2014.09);
(Continued)

(58) Field of Classification Search
CPC ........ A63F 13/21; A63F 13/213; A63F 13/27; A63F 13/40; A63F 2300/1093;
(Continued)

(56) References Cited

U.S. PATENT DOCUMENTS

| | | | |
|---|---|---|---|
| 5,946,444 | A | 8/1999 | Evans et al. |
| 6,142,368 | A | 11/2000 | Mullins et al. |

(Continued)

FOREIGN PATENT DOCUMENTS

| | | | |
|---|---|---|---|
| JP | 2003288472 A | 10/2003 | |
| JP | 2004126791 A | 4/2004 | |

(Continued)

OTHER PUBLICATIONS

Clements, Ryan; "Kinect Adventures Review—IGN", Nov. 3, 2010; URL:https://www.ign.com/articles/2010/11/04/kinect-adventures-review; pp. 6-8.

(Continued)

*Primary Examiner* — Lawrence S Galka
(74) *Attorney, Agent, or Firm* — Fletcher Yoder, P.C.

(57) ABSTRACT

An interactive video game system includes an array of volumetric sensors disposed around a play area and configured to collect respective volumetric data for each of a plurality of players. The system includes a controller communicatively coupled to the array of volumetric sensors. The controller is configured to: receive, from the array of volumetric sensors, respective volumetric data of each of the plurality of players; to combine the respective volumetric data of each of the plurality of players to generate at least one respective model for each of the plurality of players; to generate a respective virtual representation for each player of the plurality of players based, at least in part, on the generated at least one respective model of each player of the plurality of players; and to present the generated respective virtual representation of each player of the plurality of players in a virtual environment.

20 Claims, 6 Drawing Sheets

(51) Int. Cl.

| | | |
|---|---|---|
| *A63F 13/52* | (2014.01) | |
| *A63F 13/213* | (2014.01) | |
| *A63F 13/25* | (2014.01) | |
| *A63F 13/335* | (2014.01) | |
| *G06T 15/08* | (2011.01) | |
| *G06T 15/60* | (2006.01) | |
| *G06F 16/951* | (2019.01) | |
| *A63F 13/843* | (2014.01) | |
| *A63F 13/655* | (2014.01) | |
| *A63F 13/428* | (2014.01) | |

(52) U.S. Cl.
CPC .......... *A63F 13/428* (2014.09); *A63F 13/655* (2014.09); *A63F 13/843* (2014.09); *G06F 3/011* (2013.01); *G06F 16/951* (2019.01); *G06T 15/08* (2013.01); *G06T 15/60* (2013.01)

(58) Field of Classification Search
CPC ..... A63F 2300/5553; A63F 2300/8088; G06F 3/011; G06F 3/017; G06F 2203/012; G06K 9/00335; G06K 9/00342; G06T 2200/08
See application file for complete search history.

(56) References Cited

U.S. PATENT DOCUMENTS

| | | |
|---|---|---|
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,507,353 B1 | 1/2003 | Huard et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,921,332 B2 | 7/2005 | Fukunaga et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,071,914 B1 | 7/2006 | Marks |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |

(56) References Cited

U.S. PATENT DOCUMENTS

| | | |
|---|---|---|
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,159,151 B2 | 10/2015 | Perez et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,183,676 B2 | 11/2015 | McCulloch et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,229,530 B1 | 1/2016 | Wu et al. |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,377,857 B2 | 6/2016 | Geisner et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,821,224 B2 | 11/2017 | Latta et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 10,010,790 B2 | 7/2018 | Weston et al. |
| 10,022,624 B2 | 7/2018 | Barney et al. |
| 10,241,565 B2 * | 3/2019 | Yamaguchi ............ G06F 3/0482 |
| 2006/0033713 A1 | 2/2006 | Pryor |
| 2010/0199228 A1 | 8/2010 | Latta |
| 2010/0203973 A1 * | 8/2010 | Muth ....................... A63F 13/79 |
| | | 463/43 |
| 2010/0302138 A1 | 12/2010 | Poot et al. |
| 2012/0286938 A1 | 11/2012 | Cote et al. |
| 2013/0324059 A1 | 12/2013 | Lee et al. |
| 2014/0094307 A1 * | 4/2014 | Doolittle ............ G06K 9/00335 |
| | | 463/36 |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0244976 A1 | 8/2015 | Chen et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0129335 A1 | 5/2016 | Domansky et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0275722 A1 | 9/2016 | Bretschneider et al. |
| 2016/0307398 A1 | 10/2016 | Walker et al. |
| 2016/0321548 A1 | 11/2016 | Ziskind et al. |
| 2016/0350973 A1 | 12/2016 | Shapira et al. |
| 2016/0373522 A1 | 12/2016 | Carlos et al. |
| 2017/0091850 A1 | 3/2017 | Alvarez et al. |

(56) References Cited

U.S. PATENT DOCUMENTS

| | | |
|---|---|---|
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0225069 A1 | 8/2017 | Goslin et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0008897 A1 | 1/2018 | Ackley et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |
| 2018/0365887 A1 | 12/2018 | Wang et al. |

FOREIGN PATENT DOCUMENTS

| | | |
|---|---|---|
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |

OTHER PUBLICATIONS

Mirabella, Fran; "Your Shape: Fitness Evolved Review—IGN", Nov. 8, 2010; URL:https://www.ign.com/articles/2010/11/09/your-shape-fitness-evolved-review; pp. 6-8.
PCT/US2018/059465 Invitation to Pay Additional Fees dated Jan. 23, 2019.
PCT/US2018/059470 Invitation to Pay Additional Fees dated Jan. 24, 2019.
U.S. Appl. No. 15/861,502, filed Jan. 3, 2018, Wei Cheng Yeh.
U.S. Appl. No. 15/874,671, filed Jan. 18, 2018, Wei Cheng Yeh.
U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,788, filed Jan. 29, 2018, Wei Chang Yeh.
U.S. Appl. No. 15/882,738, filed Jan. 29, 2018, Travis Jon Cossairt.
U.S. Appl. No. 15/972,940, filed May 7, 2018, Unavailable.
U.S. Appl. No. 15/995,633, filed Jun. 1, 2018, Unavailable.
U.S. Appl. No. 16/196,967, filed Nov. 20, 2018, Matthew Usi.
U.S. Appl. No. 15/826,357, filed Nov. 29, 2017, Wei Yeh.

\* cited by examiner

INTERACTIVE VIDEO GAME SYSTEM

CROSS-REFERENCE TO RELATED APPLICATION

This application is a continuation of U.S. Non-Provisional patent application Ser. No. 15/833,839, entitled "INTERACTIVE VIDEO GAME SYSTEM," filed Dec. 6, 2017, which is hereby incorporated by reference in its entirety.

BACKGROUND

The present disclosure relates generally to video game systems and, more specifically, to an interactive video game system that enables simultaneous multi-player game play.

Video game systems generally enable players to control characters in a virtual environment to achieve predefined goals or objectives. Traditional video game systems generally rely on manual input devices, such as joysticks, game controllers, keyboards, and so forth, to enable players to control characters within the virtual environment of the game. Additionally, certain modern video game systems can include a camera capable of tracking the movements of players, enabling players to control video game characters based on their movements. However, these systems typically suffer from issues with occlusion, in which a portion of a player is at least temporarily obscured from the camera and, as a result, the system is no longer able to accurately track the position or movements of the player. For example, occlusion can cause jittering or stuttering in the movements of the characters in the virtual environment, as well as other imprecise or erroneous translation of player actions into character actions within the game. Additionally, for multi-player video game systems, the potential for occlusion dramatically increases with the number of players.

BRIEF DESCRIPTION

Present embodiments are directed to an interactive video game system that includes an array of volumetric sensors disposed around a play area that is configured to collect respective volumetric data for each of a plurality of players. The system includes a controller communicatively coupled to the array of volumetric sensors. The controller is configured to receive, from the array of volumetric sensors, respective volumetric data of each of the plurality of players. The controller is configured to combine the respective volumetric data of each of the plurality of players to generate at least one respective model for each of the plurality of players. The controller is also configured to generate a respective virtual representation for each player of the plurality of players based, at least in part, on the generated at least one respective model of each player of the plurality of players. The controller is further configured to present the generated respective virtual representation of each player of the plurality of players in a virtual environment.

Present embodiments are also directed to an interactive video game system having a display device disposed near a play area and configured to display a virtual environment to a plurality of players in the play area. The system includes an array of sensing units disposed around the play area, wherein each sensing unit of the array is configured to determine a partial model of at least one player of the plurality of players. The system also includes a controller communicatively coupled to the array of sensing units. The controller is configured to: receive, from the array of sensing units, the partial models of each player of the plurality of players; generate a respective model of each player of the plurality of players by fusing the partial models of each player of the plurality of players; determine in-game actions of each player of the plurality of players based, at least in part, on the generated respective model of each player of the plurality of players; and display a respective virtual representation of each player of the plurality of players in the virtual environment on the display device based, at least in part, on the generated respective model and the in-game actions of each player of the plurality of players.

Present embodiments are also directed to a method of operating an interactive video game system. The method includes receiving, via processing circuitry of a controller of the interactive video game system, partial models of a plurality of players positioned within a play area from an array of sensing units disposed around the play area. The method includes fusing, via the processing circuitry, the received partial models of each player of the plurality of players to generate a respective model of each player of the plurality of players. The method includes determining, via the processing circuitry, in-game actions of each player of the plurality of players based, at least in part, on the generated respective models of each player of the plurality of players. The method also includes presenting, via a display device, a virtual representation of each player of the plurality of players in a virtual environment based, at least in part, on the generated respective model and the in-game actions of each player of the plurality of players.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As used herein, a "volumetric scanning data" refers to three-dimensional (3D) data, such as point cloud data, collected by optically measuring (e.g., imaging, ranging)

visible outer surfaces of players in a play area. As used herein, a "volumetric model" is a 3D model generated from the volumetric scanning data of a player that generally describes the outer surfaces of the player and may include texture data. A "shadow model," as used herein, refers to a texture-less volumetric model of a player generated from the volumetric scanning data. As such, when presented on a two-dimensional (2D) surface, such as a display device, the shadow model of a player has a shape substantially similar to a shadow or silhouette of the player when illuminated from behind. A "skeletal model," as used herein, refers to a 3D model generated from the volumetric scanning data of a player that defines predicted locations and positions of certain bones (e.g., bones associated with the arms, legs, head, spine) of a player to describe the location and pose of the player within a play area.

Present embodiments are directed to an interactive video game system that enables multiple players (e.g., up to 12) to perform actions in a physical play area to control virtual representations of the players in a displayed virtual environment. The disclosed interactive video game system includes an array having two or more volumetric sensors, such as depth cameras and Light Detection and Ranging (LIDAR) devices, capable of volumetrically scanning each of the players. The system includes suitable processing circuitry that generates models (e.g., volumetric models, shadow models, skeletal models) for each player based on the volumetric scanning data collected by the array of sensors, as discussed below. During game play, at least two volumetric sensors capture the actions of the players in the play area, and the system determines the nature of these actions based on the generated player models. Accordingly, the interactive video game system continuously updates the virtual representations of the players and the virtual environment based on the actions of the players and their corresponding in-game effects.

As mentioned, the array of the disclosed interactive video game system includes multiple volumetric sensors arranged around the play area to monitor the actions of the players within the play area. This generally ensures that a skeletal model of each player can be accurately generated and updated throughout game play despite potential occlusion from the perspective of one or more volumetric sensors of the array. Additionally, the processing circuitry of the system may use the volumetric scanning data to generate aspects (e.g., size, shape, outline) of the virtual representations of each player within the virtual environment. In certain embodiments, certain aspects (e.g., color, texture, scale) of the virtual representation of each player may be further adjusted or modified based on information associated with the player. As discussed below, this information may include information related to game play (e.g., items acquired, achievements unlocked), as well as other information regarding activities of the player outside of the game (e.g., player performance in other games, items purchased by the player, locations visited by the player). Furthermore, the volumetric scanning data collected by the array of volumetric sensors can be used by the processing circuitry of the game system to generate additional content, such as souvenir images in which a volumetric model of the player is illustrated as being within the virtual world. Accordingly, the disclosed interactive video game system enables immersive and engaging experience for multiple simultaneous players.

Figure 1:
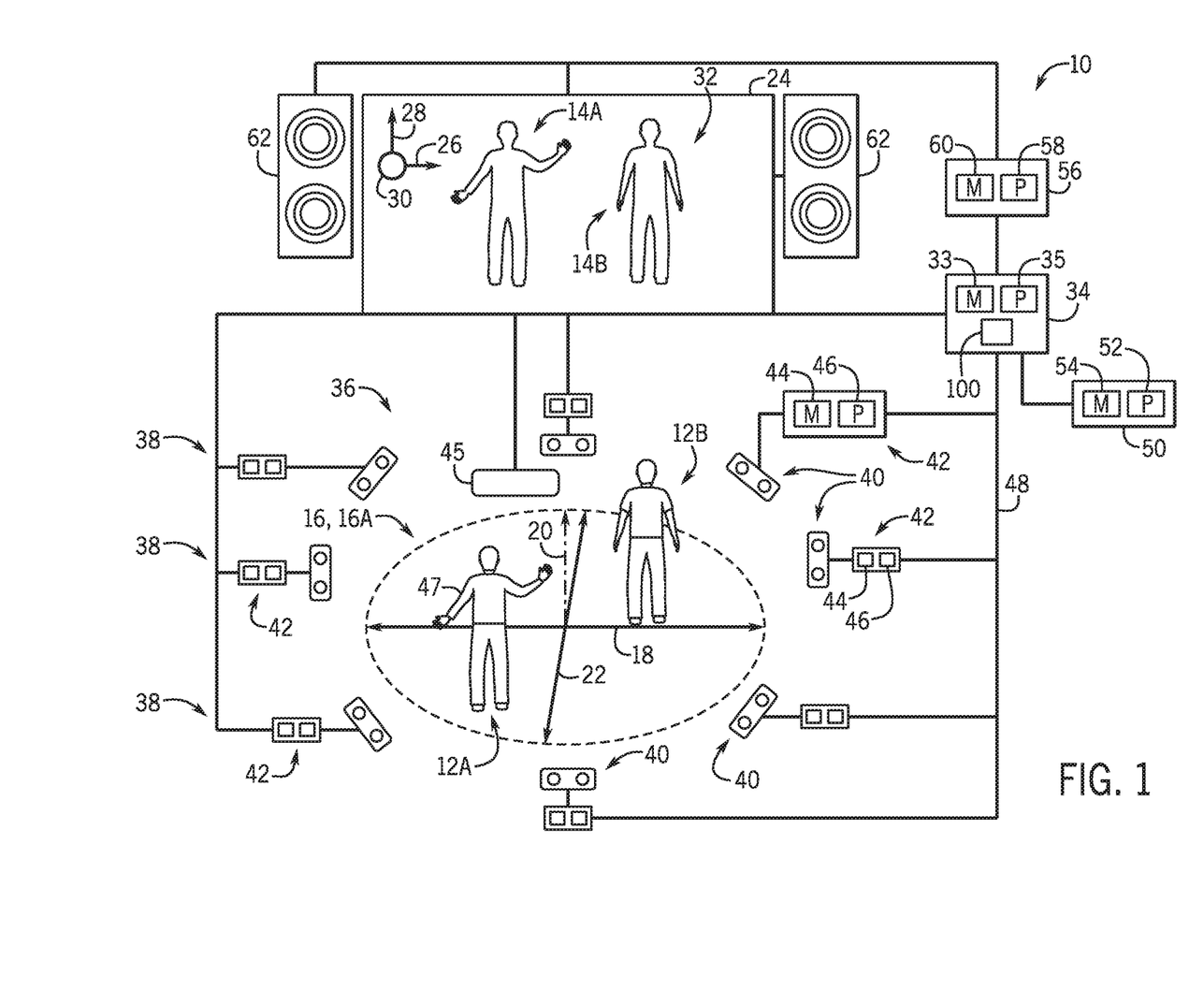
FIG. 1 is a schematic diagram of an embodiment of an interactive video game system that enables multiple players to control respective virtual representations by performing actions in a three-dimensional (3D) play area, in accordance with the present technique.

With the foregoing in mind, FIG. 1 is a schematic diagram of an embodiment of an interactive video game system 10 that enables multiple players 12 (e.g., players 12A and 12B) to control respective virtual representations 14 (e.g., virtual representations 14A and 14B), respectively, by performing actions in a play area 16. It may be noted that while, for simplicity, the present description is directed to two players 12 using the interactive video game system 10, in other embodiments, the interactive video game system 10 can support more than two (e.g., 6, 8, 10, 12, or more) players 12. The play area 16 of the interactive video game system 10 illustrated in FIG. 1 is described herein as being a 3D play area 16A. The term "3D play area" is used herein to refer to a play area 16 having a width (corresponding to an x-axis 18), a height (corresponding to a y-axis 20), and depth (corresponding to a z-axis 22), wherein the system 10 generally monitors the movements each of players 12 along the x-axis 18, y-axis 20, and z-axis 22. The interactive video game system 10 updates the location of the virtual representations 14 presented on a display device 24 along an x-axis 26, a y-axis 28, and z-axis 30 in a virtual environment 32 in response to the players 12 moving throughout the play area 16. While the 3D play area 16A is illustrated as being substantially circular, in other embodiments, the 3D play area 16A may be square shaped, rectangular, hexagonal, octagonal, or any other suitable 3D shape.

The embodiment of the interactive video game system 10 illustrated in FIG. 1 includes a primary controller 34, having memory circuitry 33 and processing circuitry 35, that generally provides control signals to control operation of the system 10. As such, the primary controller 34 is communicatively coupled to an array 36 of sensing units 38 disposed around the 3D play area 16A. More specifically, the array 36 of sensing units 38 may be described as symmetrically distributed around a perimeter of the play area 16. In certain embodiments, at least a portion of the array 36 of sensing units 38 may be positioned above the play area 16 (e.g., suspended from a ceiling or on elevated platforms or stands) and pointed at a downward angle to image the play area 16. In other embodiments, at least a portion of the array 36 of sensing units 38 may be positioned near the floor of the play area 16 and pointed at an upward angle to image the play area 16. In certain embodiments, the array 36 of the interactive video game system 10 may include at least two at least two sensing units 38 per player (e.g., players 12A and 12B) in the play area 16. Accordingly, the array 36 of sensing units 38 is suitably positioned to image a substantial portion of potential vantage points around the play area 16 to reduce or eliminate potential player occlusion.

In the illustrated embodiment, each sensing unit 38 includes a respective volumetric sensor 40, which may be an infra-red (IR) depth camera, a LIDAR device, or another suitable ranging and/or imaging device. For example, in certain embodiments, all of the volumetric sensors 40 of the sensing units 38 in the array 36 are either IR depth cameras or LIDAR devices, while in other embodiments, a mixture of both IR depth cameras and LIDAR devices are present within the array 36. It is presently recognized that both IR depth cameras and LIDAR devices can be used to volumetrically scan each of the players 12, and the collected volumetric scanning data can be used to generate various models of the players, as discussed below. For example, in certain embodiments, IR depth cameras in the array 36 may be used to collect data to generate skeletal models, while the data collected by LIDAR devices in the array 36 may be used to generate volumetric and/or shadow models of the players 12, which is discussed in greater detail below. It is also recognized that LIDAR devices, which collect point cloud data, are generally capable of scanning and mapping a larger area than depth cameras, typically with better accuracy and resolutions. As such, in certain embodiments, at least one sensing unit 38 of the array 36 includes a corresponding volumetric sensor 40 that is a LIDAR device to enhance the accuracy or resolution of the array 36 and/or to reduce a total number of sensing units 38 present in the array 36.

Further, each illustrated sensing unit 38 includes a sensor controller 42 having suitable memory circuitry 44 and processing circuitry 46. The processing circuitry 46 of each sensor unit 38 executes instructions stored in the memory circuitry 44 to enable the sensing unit 38 to volumetrically scan the players 12 to generate volumetric scanning data for each of the players 12. For example, in the illustrated embodiment, the sensing units 38 are communicatively coupled to the primary controller 34 via a high-speed internet protocol (IP) network 48 that enables low-latency exchange of data between the devices of the interactive video game system 10. Additionally, in certain embodiments, the sensing units 38 may each include a respective housing that packages the sensor controller 42 together with the volumetric sensor 40.

It may be noted that, in other embodiments, the sensing units 38 may not include a respective sensor controller 42. For such embodiments, the processing circuitry 35 of the primary controller 34, or other suitable processing circuitry of the system 10, is communicatively coupled to the respective volumetric sensors 40 of the array 36 to provide control signals directly to, and to receive data signals directly from, the volumetric sensors 40. However, it is presently recognized that processing (e.g., filtering, skeletal mapping) the volumetric scanning data collected by each of these volumetric sensors 40 can be processor-intensive. As such, in certain embodiments, it can be advantageous to divide the workload by utilizing dedicated processors (e.g., processors 46 of each of the sensor controllers 42) to process the volumetric data collected by the respective sensor 40, and then to send processed data to the primary controller 34. For example, in the illustrated embodiment, each of processors 46 of the sensor controllers 42 process the volumetric scanning data collected by their respective sensor 40 to generate partial models (e.g., partial volumetric models, partial skeletal models, partial shadow models) of each of the players 12, and the processing circuitry 35 of the primary controller 34 receives and fuses or combines the partial models to generate complete models of each of the players 12, as discussed below.

Additionally, in certain embodiments, the primary controller 34 may also receive information from other sensing devices in and around the play area 16. For example, the illustrated primary controller 34 is communicatively coupled to a radio-frequency (RF) sensor 45 disposed near (e.g., above, below, adjacent to) the 3D play area 16A. The illustrated RF sensor 45 receives a uniquely identifying RF signal from a wearable device 47, such as a bracelet or headband having a radio-frequency identification (RFID) tag worn by each of the players 12. In response, the RF sensor 45 provides signals to the primary controller 34 regarding the identity and the relative positions of the players 12 in the play area 16. As such, for the illustrated embodiment, processing circuitry 35 of the primary controller 34 receives and combines the data collected by the array 36, and potentially other sensors (e.g., RF sensor 45), to determine the identities, locations, and actions of the players 12 in the play area 16 during game play. Additionally, the illustrated primary controller 34 is communicatively coupled to a database system 50, or any other suitable data repository storing player information. The database system 50 includes processing circuitry 52 that executes instructions stored in memory circuitry 54 to store and retrieve information associated with the players 12, such as player models (e.g., volumetric, shadow, skeletal), player statistics (e.g., wins, losses, points, total game play time), player attributes or inventory (e.g., abilities, textures, items), player purchases at a gift shop, player points in a loyalty rewards program, and so forth. The processing circuitry 35 of the primary controller 34 may query, retrieve, and update information stored by the database system 50 related to the players 12 to enable the system 10 to operate as set forth herein.

Additionally, the embodiment of the interactive video game system 10 illustrated in FIG. 1 includes an output controller 56 that is communicatively coupled to the primary controller 34. The output controller 56 generally includes processing circuitry 58 that executes instructions stored in memory circuitry 60 to control the output of stimuli (e.g., audio signals, video signals, lights, physical effects) that are observed and experienced by the players 12 in the play area 16. As such, the illustrated output controller 56 is communicatively coupled to audio devices 62 and display device 24 to provide suitable control signals to operate these devices to provide particular output. In other embodiments, the output controller 56 may be coupled to any suitable number of audio and/or display devices. The display device 24 may be any suitable display device, such as a projector and screen, a flat-screen display device, or an array of flat-screen display devices, which is arranged and designed to provide a suitable view of the virtual environment 32 to the players 12 in the play area 16. In certain embodiments, the audio devices 62 may be arranged into an array about the play area 16 to increase player immersion during game play. In other embodiments, the system 10 may not include the output controller 56, and the processing circuitry 35 of the primary controller 34 may be communicatively coupled to the audio devices 62, display device 34, and so forth, to generate the various stimuli for the players 12 in the play area 16 to observe and experience.

Figure 2:
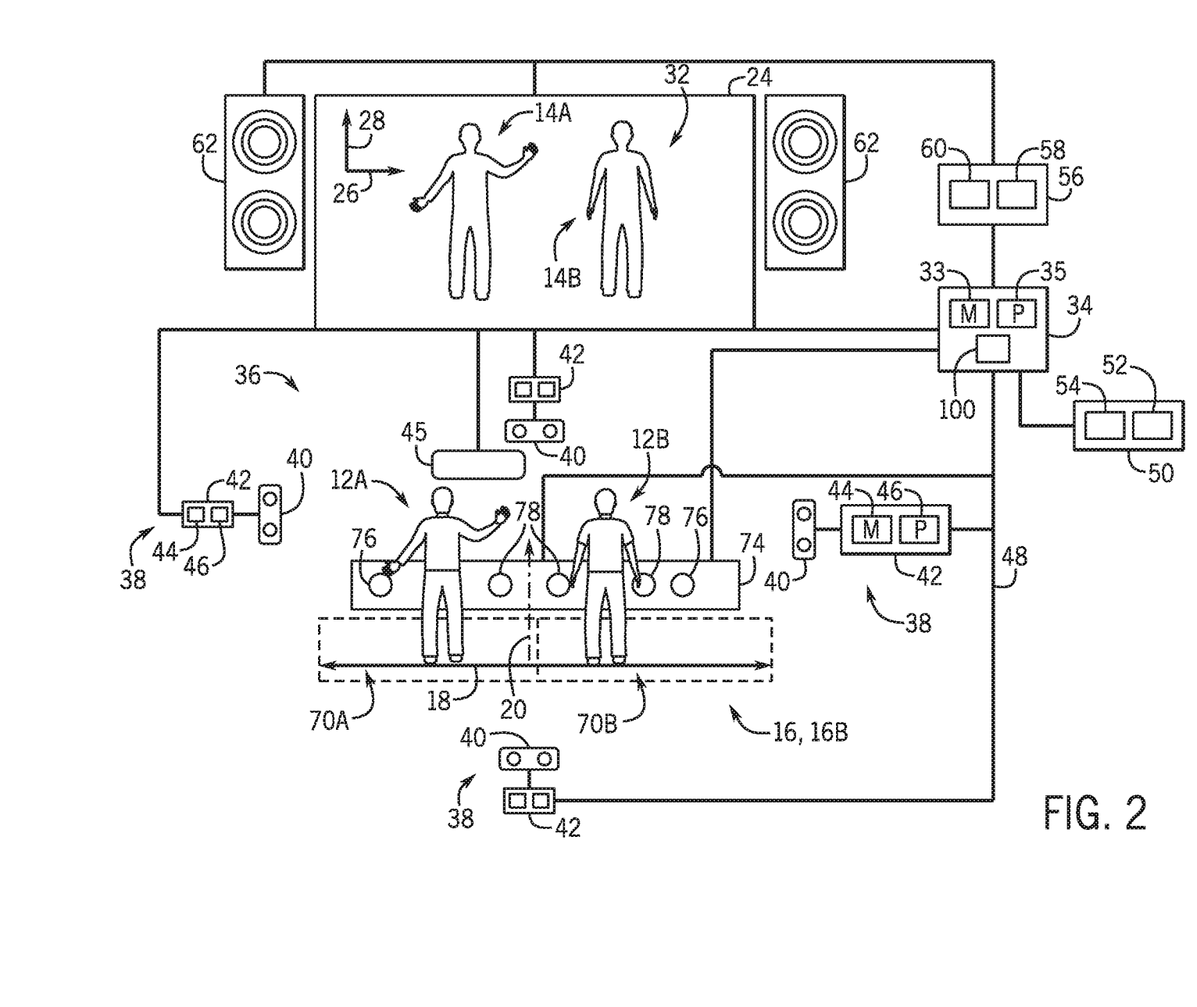
FIG. 2 is a schematic diagram of another embodiment of the interactive video game system having a two-dimensional (2D) play area, in accordance with the present technique.

FIG. 2 is a schematic diagram of another embodiment of the interactive video game system 10, which enables multiple players 12 (e.g., player 12A and 12B) to control virtual representations 14 (e.g., virtual representations 14A and 14B) by performing actions in the play area 16. The embodiment of the interactive video game system 10 illustrated in FIG. 2 includes many of the features discussed herein with respect to FIG. 1, including the primary controller 34, the array 36 of sensing units 38, the output controller 56, and the display device 24. However, the embodiment of the interactive video game system 10 illustrated in FIG. 2 is described herein as having a 2D play area 16B. The term "2D play area" is used herein to refer to a play area 16 having a width (corresponding to the x-axis 18) and a height (corresponding to the y-axis 20), wherein the system 10 generally monitors the movements each of players 12 along the x-axis 18 and y-axis 20. For the embodiment illustrated in FIG. 2, the players 12A and 12B are respectively assigned sections 70A and 70B of the 2D play area 16B, and the players 12 do not wander outside of their respective assigned sections during game play. The interactive video game system 10 updates the location of the virtual representations 14 presented on the display device 24 along the x-axis 26 and the y-axis 28 in the virtual environment 32 in response to the players 12 moving (e.g., running along the x-axis 18, jumping along the y-axis 20) within the 2D play area 16B.

Additionally, the embodiment of the interactive video game system 10 illustrated in FIG. 2 includes an interface panel 74 that can enable enhanced player interactions. As illustrated in FIG. 2, the interface panel 74 includes a number of input devices 76 (e.g., cranks, wheels, buttons, sliders, blocks) that are designed to receive input from the players 12 during game play. As such, the illustrated interface panel 74 is communicatively coupled to the primary controller 34 to provide signals to the controller 34 indicative of how the players 12 are manipulating the input devices 76 during game play. The illustrated interface panel 74 also includes a number of output devices 78 (e.g., audio output devices, visual output devices, physical stimulation devices) that are designed to provide audio, visual, and/or physical stimuli to the players 12 during game play. As such, the illustrated interface panel 74 is communicatively coupled to the output controller 56 to receive control signals and to provide suitable stimuli to the players 12 in the play area 16 in response to suitable signals from the primary controller 34. For example, the output devices 78 may include audio devices, such as speakers, horns, sirens, and so forth. Output devices 78 may also include visual devices such as lights or display devices of the interface panel 74. In certain embodiments, the output devices 78 of the interface panel 74 include physical effect devices, such as an electronically controlled release valve coupled to a compressed air line, which provides burst of warm or cold air or mist in response to a suitable control signal from the primary controller 34 or the output controller 56.

As illustrated in FIG. 2, the array 36 of sensing units 38 disposed around the 2D play area 16B of the illustrated embodiment of the interactive video game system 10 includes at least two sensing units 38. That is, while the embodiment of the interactive video game system 10 illustrated in FIG. 1 includes the array 36 having at least two sensing units 38 per player, the embodiment of the interactive video game system 10 illustrated in FIG. 2 includes the array 36 that may include as few as two sensing units 38 regardless of the number of players. In certain embodiments, the array 36 may include at least two sensing units disposed at right angles (90°) with respect to the players 12 in the 2D play area 16B. In certain embodiments, the array 36 may additionally or alternatively include at least two sensing units disposed on opposite sides (180°) with respect to the players 12 in the play area 16B. By way of specific example, in certain embodiments, the array 36 may include only two sensing units 38 disposed on different (e.g., opposite) sides of the players 12 in the 2D play area 16B.

As mentioned, the array 36 illustrated in FIGS. 1 and 2 is capable of collecting volumetric scanning data for each of the players 12 in the play area 16. In certain embodiments, the collected volumetric scanning data can be used to generate various models (e.g., volumetric, shadow, skeletal) for each player, and these models can be subsequently updated based on the movements of the players during game play, as discussed below. However, it is presently recognized that using volumetric models that include texture data is substantially more processor intensive (e.g., involves additional filtering, additional data processing) than using shadow models that lack this texture data. For example, in certain embodiments, the processing circuitry 35 of the primary controller 34 can generate a shadow model for each of the players 12 from volumetric scanning data collected by the array 36 by using edge detection techniques to differentiate between the edges of the players 12 and their surroundings in the play area 16. It is presently recognized that such edge detection techniques are substantially less processor-intensive and involve substantially less filtering than using a volumetric model that includes texture data. As such, it is presently recognized that certain embodiments of the interactive video game system 10 generate and update shadow models instead of volumetric models that include texture, enabling a reduction in the size, complexity, and cost of the processing circuitry 35 of the primary controller 34. Additionally, as discussed below, the processing circuitry 34 can generate the virtual representations 14 of the players 12 based, at least in part, on the generated shadow models.

Figure 3:
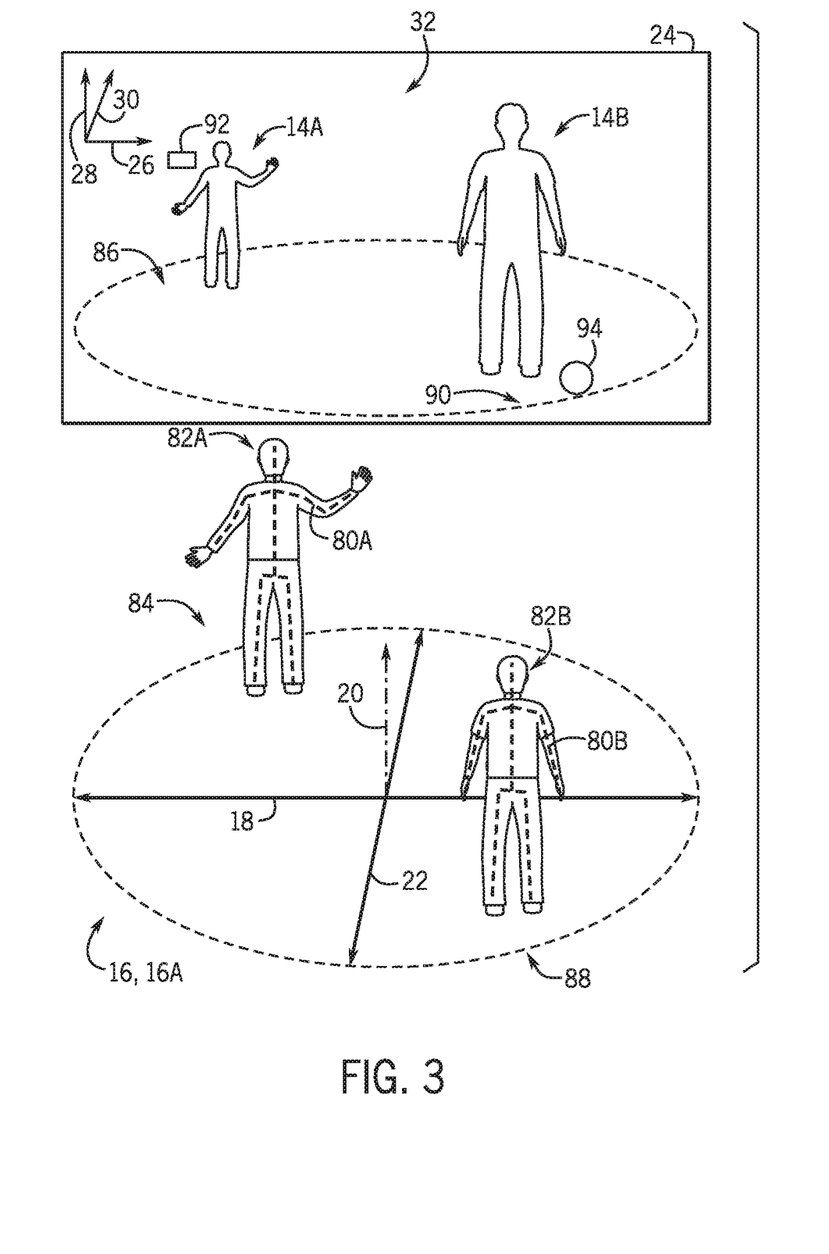
FIG. 3 is a diagram illustrating an example of skeletal and shadow models representative of players in the 3D play area, as well as corresponding virtual representations of the players presented in the virtual environment, in accordance with the present technique.

As mentioned, the volumetric scanning data collected by the array 36 of the interactive video game system 10 can be used to generate various models (e.g., volumetric, shadow, skeletal) for each player. For example, FIG. 3 is a diagram illustrating skeletal models 80 (e.g., skeletal models 80A and 80B) and shadow models 82 (e.g., shadow models 82A and 82B) representative of players in the 3D play area 16A. FIG. 3 also illustrates corresponding virtual representations 14 (e.g., virtual representations 14A and 14B) of these players presented in the virtual environment 32 on the display device 24, in accordance with the present technique. As illustrated, the represented players are located at different positions within the 3D play area 16A of the interactive video game system 10 during game play, as indicated by the locations of the skeletal models 80 and the shadow models 82. The illustrated virtual representations 14 of the players in the virtual environment 32 are generated, at least in part, based on the shadow models 82 of the players. As the players move within the 3D play area 16A, as mentioned above, the primary controller 34 tracks these movements and accordingly generates updated skeletal models 80 and shadow models 82, as well as the virtual representations 14 of each player.

Additionally, embodiments of the interactive video game system 10 having the 3D play area 16A, as illustrated in FIGS. 1 and 3, enable player movement and tracking along the z-axis 22 and translates it to movement of the virtual representations 14 along the z-axis 30. As illustrated in FIG. 3, this enables the player represented by the skeletal model 80A and shadow model 82A and to move a front edge 84 of the 3D play area 16A, and results in the corresponding virtual representation 14A being presented at a relatively deeper point or level 86 along the z-axis 30 in the virtual environment 32. This also enables the player represented by skeletal model 80B and the shadow model 82B to move to a back edge 88 of the 3D play area 16A, which results in the corresponding virtual representation 14B being presented at a substantially shallower point or level 90 along the z-axis 30 in the virtual environment 32. Further, for the illustrated embodiment, the size of the presented virtual representations 14 is modified based on the position of the players along the z-axis 22 in the 3D play area 16A. That is, the virtual representation 14A positioned relatively deeper along the z-axis 30 in the virtual environment 32 is presented as being substantially smaller than the virtual representation 14B positioned at a shallower depth or layer along the z-axis 30 in the virtual environment 32.

It may be noted that, for embodiments of the interactive game system 10 having the 3D player area 16A, as represented in FIGS. 1 and 3, the virtual representations 14 may only be able to interact with virtual objects that are positioned at a similar depth along the z-axis 30 in the virtual environment 32. For example, for the embodiment illustrated in FIG. 3, the virtual representation 14A is capable of interacting with a virtual object 92 that is positioned deeper along the z-axis 30 in the virtual environment 32, while the virtual representation 14B is capable of interacting with another virtual object 94 that is positioned a relatively shallower depth along the z-axis 30 in the virtual environment 32. That is, the virtual representation 14A is not able to interact with the virtual object 94 unless that player represented by the models 80A and 82A changes position along the z-axis 22 in the 3D play area 16A, such that the virtual representation 14A moves to a similar depth as the virtual object 94 in the virtual environment 32.

Figure 4:
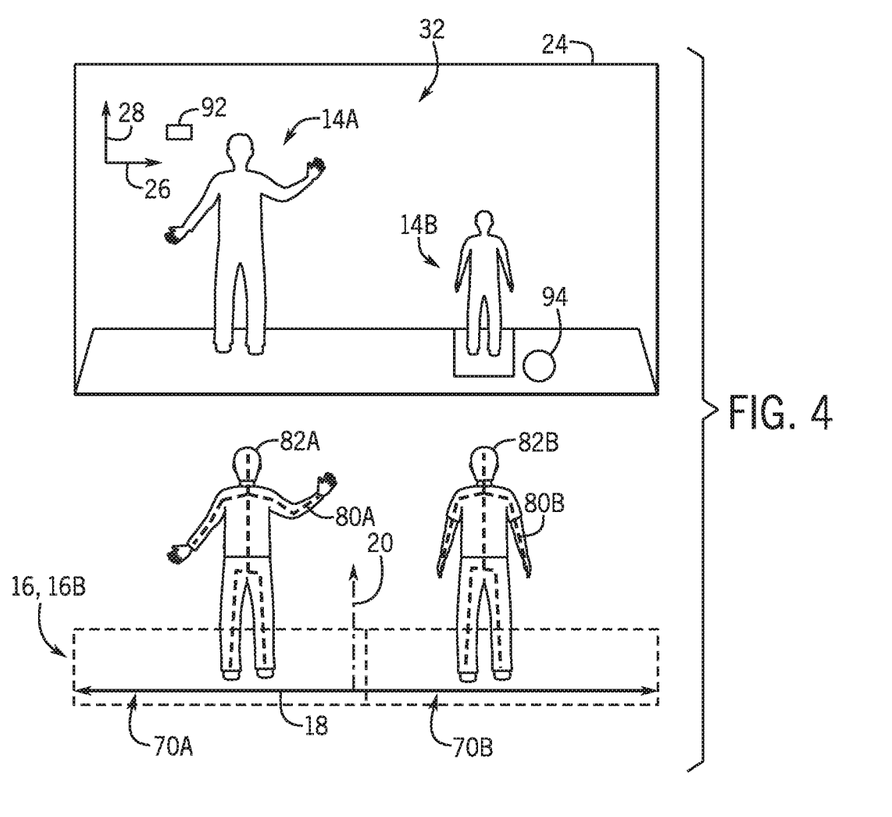
FIG. 4 is a diagram illustrating an example of skeletal and shadow models representative of players in the 2D play area, as well as corresponding virtual representations of the players presented in the virtual environment, in accordance with the present technique.

For comparison, FIG. 4 is a diagram illustrating an example of skeletal models 80 (e.g., skeletal models 80A and 80B) and shadow models 82 (e.g., shadow models 82A and 82B) representative of players in the 2D play area 16B. FIG. 4 also illustrates virtual representations 14 (e.g., virtual representations 14A and 14B) of the players presented on the display device 24. As the players move within the 2D play area 16B, as mentioned above, the primary controller 34 tracks these movements and accordingly updates the skeletal models 80, the shadow models 82, and the virtual representations 14 of each player. As mentioned, embodiments of the interactive video game system 10 having the 2D play area 16B illustrated in FIGS. 2 and 4 do not track player movement along a z-axis (e.g., z-axis 22 illustrated in FIGS. 1 and 3). Instead, for embodiments with the 2D play area 16B, the size of the presented virtual representations 14 may be modified based on a status or condition of the players inside and/or outside of game play. For example, in FIG. 4, the virtual representation 14A is substantially larger than the virtual representation 14B. In certain embodiments, the size of the virtual representations 14A and 14B may be enhanced or exaggerated in response to the virtual representation 14A or 14B interacting with a particular item, such as in response to the virtual representation 14A obtaining a power-up during a current or previous round of game play. In other embodiments, the exaggerated size of the virtual representation 14A, as well as other modifications of the virtual representations (e.g., texture, color, transparency, items worn or carried by the virtual representation), may be the result of the corresponding player interacting with objects or items outside of the interactive video game system 10, as discussed below.

It is presently recognized that embodiments of the interactive video game system 10 that utilize a 2D play area 16B, as represented in FIGS. 2 and 4, enable particular advantages over embodiments of the interactive video game system 10 that utilize the 3D play area 16A, as illustrated in FIG. 1. For example, as mentioned, the array 36 of sensing units 38 in the interactive video game system 10 having the 2D play area 16B, as illustrated in FIG. 2, includes fewer sensing units 38 than the interactive video game system 10 with the 3D play area 16A, as illustrated in FIG. 1. That is, depth (e.g., location and movement along the z-axis 22, as illustrated in FIG. 1) is not tracked for the interactive video game system 10 having the 2D play area 16B, as represented in FIGS. 2 and 4. Additionally, since players 12A and 12B remain in their respective assigned sections 70A and 70B of the 2D play area 16B, the potential for occlusion is substantially reduced. For example, by having players remain within their assigned sections 70 of the 2D play area 16B occlusion between players only occurs predictably along the x-axis 18. As such, by using the 2D play area 16B, the embodiment of the interactive video game system 10 illustrated in FIG. 2 enables the use of a smaller array 36 having fewer sensing units 38 to track the players 12, compared to the embodiment of the interactive video game system 10 of FIG. 1.

Accordingly, it is recognized that the smaller array 36 of sensing units 38 used by embodiments of the interactive video game system 10 having the 2D play area 16B also generate considerably less data to be processed than embodiments having the 3D play area 16A. For example, because occlusion between players 12 is significantly more limited and predictable in the 2D play area 16B of FIGS. 2 and 4, fewer sensing units 38 can be used in the array 36 while still covering a substantial portion of potential vantage points around the play area 16. As such, for embodiments of the interactive game system 10 having the 2D play area 16B, the processing circuitry 35 of the primary controller 34 may be smaller, simpler, and/or more energy efficient, relative to the processing circuitry 35 of the primary controller 34 for embodiments of the interactive game system 10 having the 3D play area 16A.

As mentioned, the interactive video game system 10 is capable of generating various models of the players 12. More specifically, in certain embodiments, the processing circuitry 35 of the primary controller 34 is configured to receive partial model data (e.g., partial volumetric, shadow, and/or skeletal models) from the various sensing units 38 of the array 36 and fuse the partial models into complete models (e.g., complete volumetric, shadow, and/or skeletal models) for each of the players 12. Set forth below is an example in which the processing circuitry 35 of the primary controller 34 fuses partial skeletal models received from the various sensing units 38 of the array 36. It may be appreciated that, in certain embodiments, the processing circuitry 35 of the primary controller 34 may use a similar process to fuse partial shadow model data into a shadow model and/or to fuse partial volumetric model data.

In an example, partial skeletal models are generated by each sensing unit 38 of the interactive video game system 10 and are subsequently fused by the processing circuitry 35 of the primary controller 34. In particular, the processing circuitry 35 may perform a one-to-one mapping of corresponding bones of each of the players 12 in each of the partial skeletal models generated by different sensing units 38 positioned at different angles (e.g., opposite sides, perpendicular) relative to the play area 16. In certain embodiments, relatively small differences between the partial skeletal models generated by different sensing units 38 may be averaged when fused by the processing circuitry 35 to provide smoothing and prevent jerky movements of the virtual representations 14. Additionally, when a partial skeletal model generated by a particular sensing unit differs significantly from the partial skeletal models generated by at least two other sensing units, the processing circuitry 35 of the primary controller 34 may determine the data to be erroneous and, therefore, not include the data in the skeletal models 80. For example, if a particular partial skeletal model is missing a bone that is present in the other partial skeletal models, then the processing circuitry 35 may determine that the missing bone is likely the result of occlusion, and may discard all or some of the partial skeletal model in response.

It may be noted that precise coordination of the components of the interactive game system 10 is desirable to provide smooth and responsive movements of the virtual representations 14 in the virtual environment 32. In particular, to properly fuse the partial models (e.g., partial skeletal, volumetric, and/or shadow models) generated by the sensing units 38, the processing circuitry 35 may consider the time at which each of the partial models is generated by the sensing units 38. In certain embodiments, the interactive video game system 10 may include a system clock 100, as illustrated in FIGS. 1 and 2, which is used to synchronize operations within the system 10. For example, the system clock 100 may be a component of the primary controller 34 or another suitable electronic device that is capable of generating a time signal that is broadcast over the network 48 of the interactive video game system 10. In certain embodiments, various devices coupled to the network 48 may receive and use a time signal to adjust respective clocks at particular times (e.g., at the start of game play), and the devices may subsequently include timing data based on signals from these respective clocks when providing game play data to the primary controller 34. In other embodiments, the various devices coupled to the network 48 continually receive the time signal from the system clock 100 (e.g., at regular microsecond intervals) throughout game play, and the devices subsequently include timing data from the time signal when providing data (e.g., volumetric scanning data, partial model data) to the primary controller 34. Additionally, the processing circuitry 35 of the primary controller 34 can determine whether a partial model (e.g., a partial volumetric, shadow, or skeletal model) generated by a sensor unit 38 is sufficiently fresh (e.g., recent, contemporary with other data) to be used to generate or update the complete model, or if the data should be discarded as stale. Accordingly, in certain embodiments, the system clock 100 enables the processing circuitry 35 to properly fuse the partial models generated by the various sensing units 38 into suitable volumetric, shadow, and/or skeletal models of the players 12.

Figure 5:
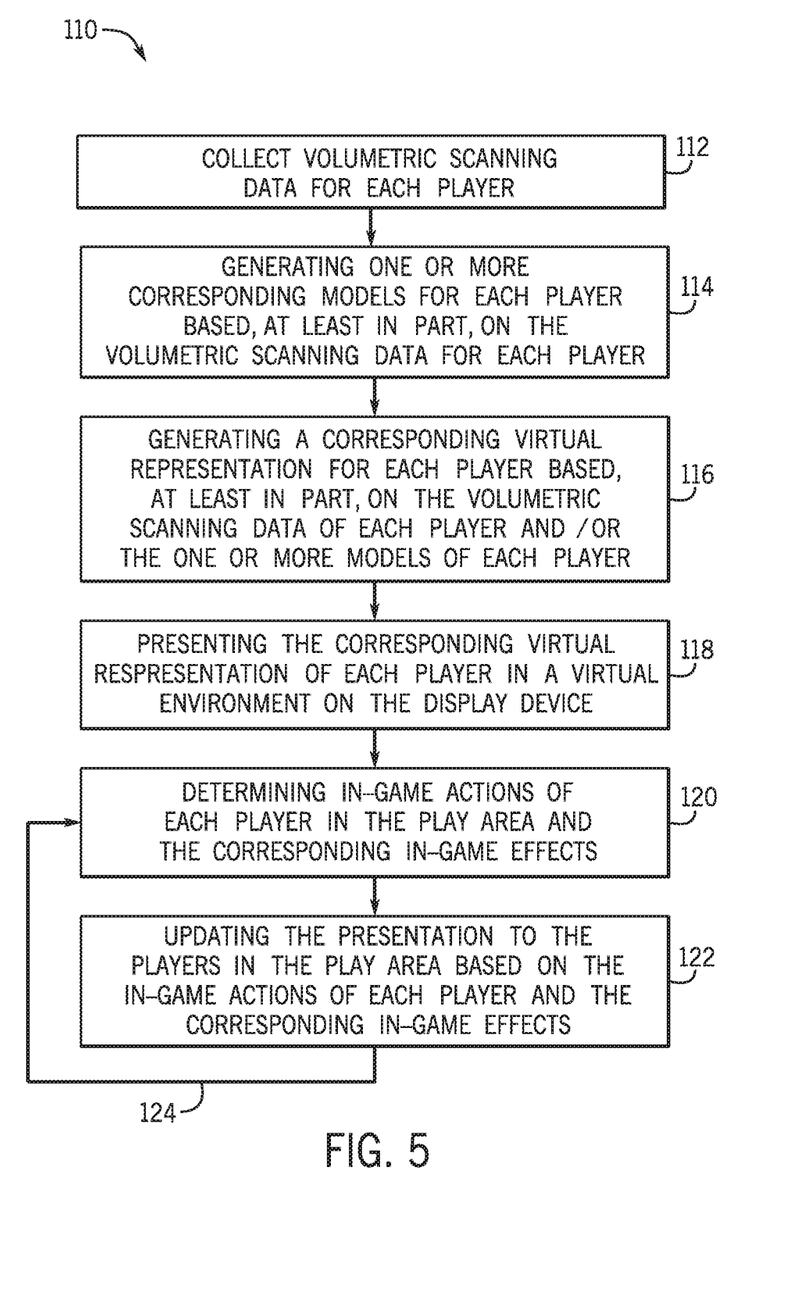
FIG. 5 is a flow diagram illustrating an embodiment of a process of operating the interactive game system, in accordance with the present technique.

FIG. 5 is a flow diagram illustrating an embodiment of a process 110 for operating the interactive game system 10, in accordance with the present technique. It may be appreciated that, in other embodiments, certain steps of the illustrated process 110 may be performed in a different order, repeated multiple times, or skipped altogether, in accordance with the present disclosure. The process 110 illustrated in FIG. 5 may be executed by the processing circuitry 35 of the primary controller 34 alone, or in combination with other suitable processing circuitry (e.g., processing circuitry 46, 52, and/or 58) of the system 10.

The illustrated embodiment of the process 110 begins with the interactive game system 10 collecting (block 112) a volumetric scanning data for each player. In certain embodiments, as illustrated in FIGS. 1-4, the players 12 may be scanned or imaged by the sensing units 38 positioned around the play area 16. For example, in certain embodiments, before game play begins, the players 12 may be prompted to strike a particular pose, while the sensing units 38 of the array 36 collect volumetric scanning data regarding each player. In other embodiments, the players 12 may be volumetrically scanned by a separate system prior to entering the play area 16. For example, a line of waiting players may be directed through a pre-scanning system (e.g., similar to a security scanner at an airport) in which each player is individually volumetrically scanned (e.g., while striking a particular pose) to collect the volumetric scanning data for each player. In certain embodiments, the pre-scanning system may be a smaller version of the 3D play area 16A illustrated in FIG. 1 or the 2D play area 16B in FIG. 2, in which an array 36 of sensing units 38 are positioned about an individual player to collect the volumetric scanning data. In other embodiments, the pre-scanning system may include fewer sensing units 38 (e.g., 1, 2, 3) positioned around the individual player, and the sensing units 38 are rotated around the player to collect the complete volumetric scanning data. It is presently recognized that it may be desirable to collect the volumetric scanning data indicated in block 112 while the players 12 are in the play area 16 to enhance the efficiency of the interactive game system 10 and to reduce player wait times.

Next, the interactive video game system 10 generates (block 114) corresponding models for each player based on the volumetric scanning data collected for each player. As set forth above, in certain embodiments, the processing circuitry 35 of the primary controller may receive partial models for each of the players from each of the sensing units 38 in the array 36, and may suitably fuse these partial models to generate suitable models for each of the players. For example, the processing circuitry 35 of the primary controller 34 may generate a volumetric model for each player that generally defines a 3D shape of each player. Additionally or alternatively, the processing circuitry 35 of the primary controller 34 may generate a shadow model for each player that generally defines a texture-less 3D shape of each player. Furthermore, the processing circuitry 35 may also generate a skeletal model that generally defines predicted skeletal positions and locations of each player within the play area.

Continuing through the example process 110, next, the interactive video game system 10 generates (block 116) a corresponding virtual representation for each player based, at least in part on, the on the volumetric scanning data collected for each player and/or one or more the models generated for each player. For example, in certain embodiments, the processing circuitry 35 of the primary controller 34 may use a shadow model generated in block 114 as a basis to generate a virtual representation of a player. It may be appreciated that, in certain embodiments, the virtual representations 14 may have a shape or outline that is substantially similar to the shadow model of the corresponding player, as illustrated in FIGS. 3 and 4. In addition to shape, the virtual representations 14 may have other properties that can be modified to correspond to properties of the represented player. For example, a player may be associated with various properties (e.g., items, statuses, scores, statistics) that reflect their performance in other game systems, their purchases in a gift shop, their membership to a loyalty program, and so forth. Accordingly, properties (e.g., size, color, texture, animations, presence of virtual items) of the virtual representation may be set in response to the various properties associated with the corresponding player, and further modified based on changes to the properties of the player during game play.

It may be noted that, in certain embodiments, the virtual representations 14 of the players 12 may not have an appearance or shape that substantially resembles the generated volumetric or shadow models. For example, in certain embodiments, the interactive video game system 10 may include or be communicatively coupled to a pre-generated library of virtual representations that are based on fictitious characters (e.g., avatars), and the system may select particular virtual representations, or provide recommendations of particular selectable virtual representations, for a player generally based on the generated volumetric or shadow model of the player. For example, if the game involves a larger hero and a smaller sidekick, the interactive video game system 10 may select or recommend from the pre-generated library a relatively larger hero virtual representation for an adult player and a relatively smaller sidekick virtual representation for a child player.

The process 110 continues with the interactive video game system 10 presenting (block 118) the corresponding virtual representations 14 of each of the players in the virtual environment 32 on the display device 24. In addition to presenting, in certain embodiments, the actions in block 118 may also include presenting other introductory presentations, such as a welcome message or orientation/instructional information, to the players 12 in the play area 16 before game play begins. Furthermore, in certain embodiments, the processing circuitry 35 of the primary controller 34 may also provide suitable signals to set or modify parameters of the environment within the play area 16. For example, these modifications may include adjusting house light brightness and/or color, playing game music or game sound effects, adjusting the temperature of the play area, activating physical effects in the play area, and so forth.

Once game play begins, the virtual representations 14 generated in block 116 and presented in block 118 are capable of interacting with one another and/or with virtual objects (e.g., virtual objects 92 and 94) in the virtual environment 32, as discussed herein with respect to FIGS. 3 and 4. During game play, the interactive video game system 10 generally determines (block 120) the in-game actions of each of the players 12 in the play area 16 and the corresponding in-game effects of these in-game actions. Additionally, the interactive video game system 10 generally updates (block 122) the corresponding virtual representations 14 of the players 12 and/or the virtual environment 32 based on the in-game actions of the players 12 in the play area 16 and the corresponding in-game effects determined in block 120. As indicated by the arrow 124, the interactive video game system 10 may repeat the steps indicated in block 120 and 122 until game play is complete, for example, due to one of the players 12 winning the round of game play or due to an expiration of an allotted game play time.

Figure 6:
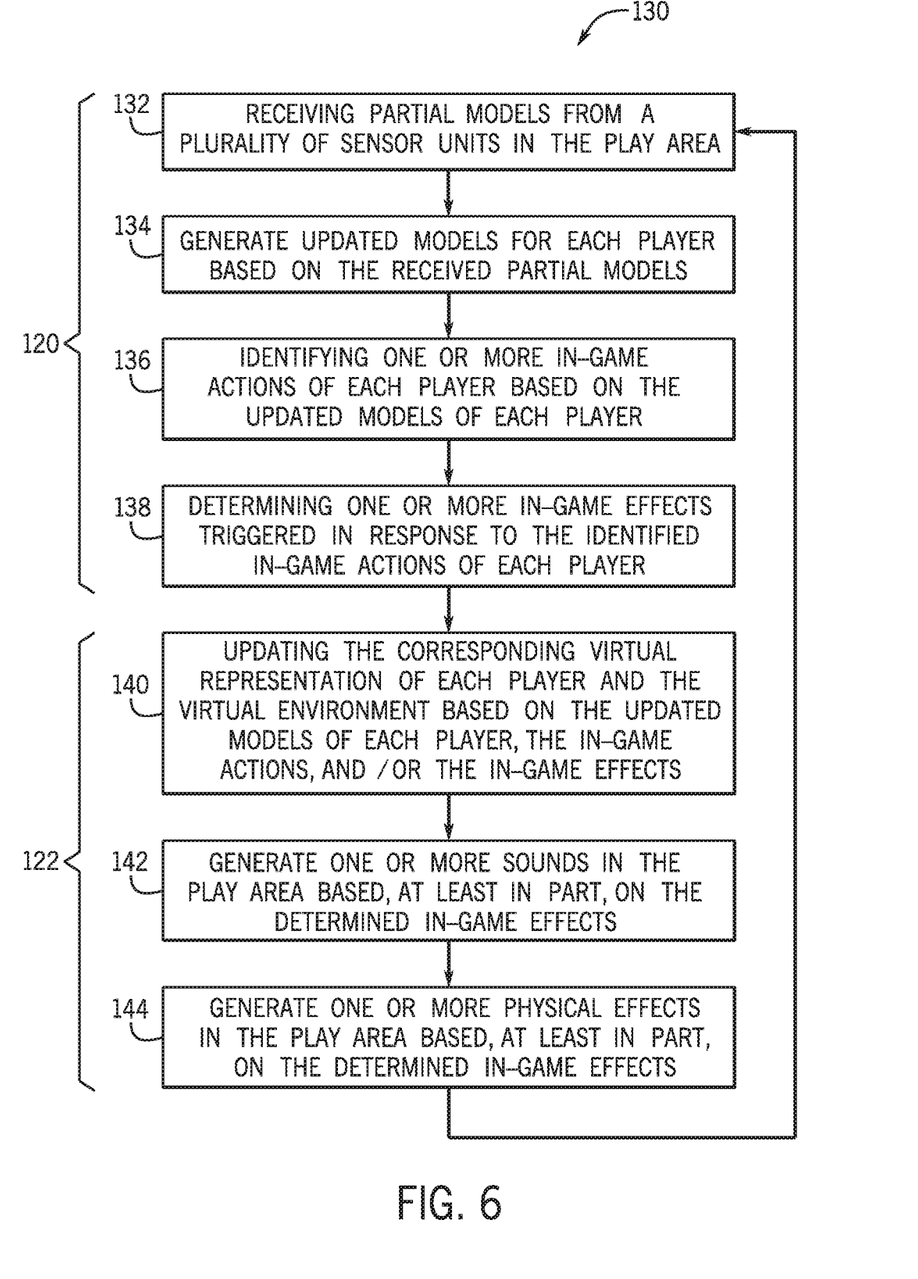
FIG. 6 is a flow diagram that illustrates an example embodiment of a process by which the interactive video game system performs certain actions indicated in the flow diagram of FIG. 5, in accordance with the present technique.

FIG. 6 is a flow diagram that illustrates an example embodiment of a more detailed process 130 by which the interactive video game system 10 performs the actions indicated in blocks 120 and 122 of FIG. 5. That is, the process 130 indicated in FIG. 6 includes a number of steps to determine the in-game actions of each player in the play area and the corresponding in-game effects of these in-game actions, as indicated by the bracket 120, as well as a number of steps to update the corresponding virtual representation of each player and/or the virtual environment, as indicated by the bracket 122. In certain embodiments, the actions described in the process 130 may be encoded as instructions in a suitable memory, such as the memory circuitry 33 of the primary controller 34, and executed by a suitable processor, such as the processing circuitry 35 of the primary controller 34, of the interactive video game system 10. It should be noted that the illustrated process 130 is merely provided as an example, and that in other embodiments, certain actions described may be performed in different orders, may be repeated, or may be skipped altogether.

The process 130 of FIG. 6 begins with the processing circuitry 35 receiving (block 132) partial models from a plurality of sensor units in the play area. As discussed herein with respect to FIGS. 1 and 2, the interactive video game system 10 includes the array 36 of sensing units 38 disposed in different positions around the play area 16, and each of these sensing units 38 is configured to generate one or more partial models (e.g. partial volumetric, shadow, and/or skeletal models) for at least a portion of the players 12. Additionally, as mentioned, the processing circuitry 35 may also receive data from other devices (e.g., RF scanner 45, input devices 76) regarding the actions of the players 16 disposed within the play area 16. Further, as mentioned, these partial models may be timestamped based on a signal from the clock 100 and provided to the processing circuitry 35 of the primary controller 34 via the high-speed IP network 48.

For the illustrated embodiment of the process 130, after receiving the partial models from the sensing units 38, the processing circuitry 35 fuses the partial models to generate (block 134) updated models (e.g., volumetric, shadow, and/or skeletal) for each player based on the received partial models. For example, the processing circuitry 35 may update a previously generated model, such as an initial skeletal model generated in block 114 of the process 110 of FIG. 5. Additionally, as discussed, when combining the partial models, the processing circuitry 35 may filter or remove data that is inconsistent or delayed to improve accuracy when tracking players despite potential occlusion or network delays.

Next, the illustrated process 130 continues with the processing circuitry 35 identifying (block 136) one or more in-game actions of the corresponding virtual representations 14 of each player 12 based, at least in part, on the updated models of the players generated in block 134. For example, the in-game actions may include jumping, running, sliding, or otherwise moving of the virtual representations 14 within the virtual environment 32. In-game actions may also include interacting with (e.g., moving, obtaining, losing, consuming) an item, such as a virtual object in the virtual environment 32. In-game actions may also include completing a goal, defeating another player, winning a round, or other similar in-game actions.

Next, the processing circuitry 35 may determine (block 138) one or more in-game effects triggered in response to the identified in-game actions of each of the players 12. For example, when the determined in-game action is a movement of a player, then the in-game effect may be a corresponding change in position of the corresponding virtual representation within the virtual environment. When the determined in-game action is a jump, the in-game effect may include moving the virtual representation along the y-axis 20, as illustrated in FIGS. 1-4. When the determined in-game action is activating a particular power-up item, then the in-game effect may include modifying a status (e.g., a health status, a power status) associated with the players 12. Additionally, in certain cases, the movements of the virtual representations 14 may be accentuated or augmented relative to the actual movements of the players 12. For example, as discussed above with respect to modifying the appearance of the virtual representation, the movements of a virtual representation of a player may be temporarily or permanently exaggerated (e.g., able to jump higher, able to jump farther) relative to the actual movements of the player based on properties associated with the player, including items acquired during game play, items acquired during other game play sessions, items purchased in a gift shop, and so forth.

The illustrated process 130 continues with the processing circuitry 35 generally updating the presentation to the players in the play area 16 based on the in-game actions of each player and the corresponding in-game effects, as indicated by bracket 122. In particular, the processing circuitry 35 updates (block 140) the corresponding virtual representations 14 of each of the players 12 and the virtual environment 32 based on the updated models (e.g., shadow and skeletal models) of each player generated in block 134, the in-game actions identified in block 136, and/or the in-game effects determined in block 138, to advance game play. For example, for the embodiments illustrated in FIGS. 1 and 2, the processing circuitry 35 may provide suitable signals to the output controller 56, such that the processing circuitry 58 of the output controller 56 updates the virtual representations 14 and the virtual environment 32 presented on the display device 24.

Additionally, the processing circuitry 35 may provide suitable signals to generate (block 142) one or more sounds and/or one or more physical effects (block 144) in the play area 16 based, at least in part, on the determined in-game effects. For example, when the in-game effect is determined to be a particular virtual representation of a player crashing into a virtual pool, the primary controller 34 may cause the output controller 56 to signal the speakers 62 to generate suitable splashing sounds and/or physical effects devices 78 to generate a blast of mist. Additionally, sounds and/or physical effects may be produced in response to any number of in-game effects, including, for example, gaining a power-up, lowing a power-up, scoring a point, or moving through particular types of environments. Mentioned with respect to FIG. 5, the process 130 of FIG. 6 may repeat until game play is complete, as indicated by the arrow 124.

Furthermore, it may be noted that the interactive video game system 10 can also enable other functionality using the volumetric scanning data collected by the array 36 of volumetric sensors 38. For example, as mentioned, in certain embodiments, the processing circuitry 35 of the primary controller 34 may generate a volumetric model that that includes both the texture and the shape of each player. At the conclusion of game play, the processing circuitry 35 of the primary controller 34 can generate simulated images that use the volumetric models of the players to render a 3D likeness of the player within a portion of the virtual environment 32, and these can be provided (e.g., printed, electronically transferred) to the players 12 as souvenirs of their game play experience. For example, this may include a print of a simulated image illustrating the volumetric model of a player crossing a finish line within a scene from the virtual environment 32.

The technical effects of the present approach includes an interactive video game system that enables multiple players (e.g., two or more, four or more) to perform actions in a physical play area (e.g., a 2D or 3D play area) to control corresponding virtual representations in a virtual environment presented on a display device near the play area. The disclosed system includes a plurality of sensors and suitable processing circuitry configured to collect volumetric scanning data and generate various models, such as volumetric models, shadow models, and/or skeletal models, for each player. The system generates the virtual representations of each player based, at least in in part, on a generated player models. Additionally, the interactive video game system may set or modify properties, such as size, texture, and/or color, of the of the virtual representations based on various properties, such as points, purchases, power-ups, associated with the players.

While only certain features of the present technique have been illustrated and described herein, many modifications and changes will occur to those skilled in the art. It is, therefore, to be understood that the appended claims are intended to cover all such modifications and changes as fall within the true spirit of the present technique. Additionally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A video game system, comprising:
   at least two sensing units disposed near a play area, wherein the at least two sensing units are each configured to collect respective scanning data of a player positioned in the play area and generate a partial model of the player by respective processing circuitry of each sensing unit;
   a display device disposed near the play area and configured to present a virtual environment comprising a virtual representation of the player; and
   a controller communicatively coupled to the at least two sensing units and the display device, wherein the controller comprises at least one processor configured to:
   receive the partial model of the player from each sensing unit of the at least two sensing units;
   fuse each received partial model to generate at least one model of the player; and
   generate the virtual representation based on the generated at least one model and instruct the display device to present the virtual environment comprising the generated virtual representation of the player.

2. The video game system of claim 1, wherein the generated virtual representation comprises a 2-dimensional shadow model of the player.

3. The video game system of claim 2, wherein the shadow model comprises a texture-less model of the player having a shape corresponding to a silhouette of the player.

4. The video game system of claim 1, wherein each sensing unit of the at least two sensing units comprises an infrared (IR) sensor configured to collect the respective scanning data.

5. The video game system of claim 4, wherein the at least two sensing units are positioned on an opposite portion of the play area relative to the display device.

6. The video game system of claim 1, wherein the at least one processor is configured to:
   identify an in-game action of the player based on the generated at least one model; and
   update the generated virtual representation, the presented virtual environment, or both based on the identified in-game action.

7. The video game system of claim 1, wherein the generated at least one model comprises a skeletal model of the player utilized to identify an in-game action.

8. The video game system of claim 1, comprising a radio frequency (RF) sensor configured to receive a uniquely identifying RF signal from a RF tag of the player, wherein the at least one processor is configured to:
   receive the uniquely identifying RF signal from the RF sensor; and
   identify the player from a plurality of players based on the received uniquely identifying RF signal.

9. The video game system of claim 8, wherein the at least one processor is configured to:
   query a database based on the received uniquely identifying RF signal; and
   update the generated virtual representation, statistics of the player, attributes of the player, purchases of the player, or a combination thereof, based on the query.

10. The video game system of claim 1, wherein the display device comprises an electronic screen configured to present the virtual environment to a plurality of players that comprises the player, and wherein the virtual environment comprises respective virtual representations of the plurality of players.

11. The video game system of claim 1, wherein the at least two sensing units are communicatively coupled to the controller via a high-speed internet protocol (IP) network configured to provide low-latency data exchange.

12. A video game system for an amusement attraction, wherein the video game system comprises:
- at least two sensing units disposed near a play area of the amusement attraction, wherein the at least two sensing units each comprises a sensor configured to execute one or more instructions stored in a respective memory circuitry to collect scanning data and generate a respective partial model of a player of the video game system based on the scanning data; and
- a controller communicatively coupled to the at least two sensing units and an electronic display device, wherein the controller comprises at least one processor configured to:
- receive the partial model of the player from each of the at least two sensing units;
- fuse the received partial models of the player from each of the at least two sensing units to generate at least one model of the player;
- generate a virtual representation of the player based on the generated at least one model; and
- instruct the electronic display device to present the generated virtual representation in a virtual environment.

13. The video game system of claim 12, wherein the generated virtual representation comprises a shadow model of the player.

14. The video game system of claim 12, wherein the generated at least one model comprises a skeletal model, and wherein the at least one processor is configured to:
- analyze changes in the skeletal model to identify in-game actions of the player; and
- update the virtual representation, the virtual environment, or both based on the identified in-game actions.

15. The video game system of claim 12, wherein the scanning data collected by the at least two sensing units comprises 3-dimensional scanning data.

16. The video game system of claim 12, wherein the at least one processor is configured to receive the scanning data via a high-speed IP protocol.

17. A method of operating a video game system, the method comprising:
- receiving, via processing circuitry of a controller, partial models of a player positioned within a play area, wherein the partial models are generated by respective processing circuitry of each sensing unit of a plurality of sensing units disposed near the play area;
- fusing, via the processing circuitry of the controller, the received partial models of the player to generate at least one model of the player;
- determining, via the processing circuitry of the controller, in-game actions of the player based on the generated at least one model;
- generating, via the processing circuitry of the controller, a virtual representation of the player based on the generated at least one model and the determined in-game actions; and
- presenting, via a display device, the virtual representation in a virtual environment.

18. The method of claim 17, wherein the received partial models comprise partial skeletal models, and wherein fusing the received partial models comprises:
- identifying one or more differences between the partial skeletal models; and
- averaging the identified differences to generate a smoothed skeletal model as the at least one model.

19. The method of claim 17, wherein fusing the received partial models comprises timestamping the received partial models via system clock communicatively coupled to the controller.

20. The method of claim 17, wherein the plurality of sensing units comprises two infrared (IR) sensing units that are each positioned on an opposite side of the play area from the display device.

* * * * *